(12) United States Patent
Wapenski et al.

(10) Patent No.: US 11,037,454 B2
(45) Date of Patent: Jun. 15, 2021

(54) AUTOMATIC BRAKING SYSTEM CONTROLLER

(71) Applicant: The Boeing Company, Chicago, IL (US)

(72) Inventors: Joseph Michael Wapenski, Snohomish, WA (US); Nima Forghani, Seattle, WA (US); Thomas Todd Griffith, Seattle, WA (US)

(73) Assignee: The Boeing Company, Chicago, IL (US)

( * ) Notice: Subject to any disclaimer, the term of this patent is extended or adjusted under 35 U.S.C. 154(b) by 80 days.

(21) Appl. No.: 15/343,164

(22) Filed: Nov. 3, 2016

(65) Prior Publication Data

US 2018/0122250 A1 May 3, 2018

(51) Int. Cl.
*G08G 5/06* (2006.01)
*B64C 25/42* (2006.01)
*B60T 8/17* (2006.01)

(52) U.S. Cl.
CPC ............ *G08G 5/06* (2013.01); *B64C 25/426* (2013.01); *B60T 8/1703* (2013.01)

(58) Field of Classification Search
CPC ...................................................... G08G 5/06
See application file for complete search history.

(56) References Cited

U.S. PATENT DOCUMENTS

| 5,968,106 | A  | * | 10/1999 | DeVlieg | B60T 7/22 244/183 |
| 7,212,216 | B2 | * | 5/2007  | He      | G01C 23/00 345/629 |
| 7,283,064 | B2 | * | 10/2007 | He      | G01C 23/005 340/973 |
| 8,515,601 | B2 | * | 8/2013  | Hugues  | G05D 1/0083 701/1 |
| 2007/0085705 | A1 | * | 4/2007 | He      | G01C 23/00 340/967 |

(Continued)

FOREIGN PATENT DOCUMENTS

| CN | 102750838 A | 10/2012 |
| CN | 105142997 A | 12/2015 |

(Continued)

OTHER PUBLICATIONS

Canadian Office Action, dated Dec. 24, 2021, regarding Application No. 2,982,735, 4 pages.

(Continued)

*Primary Examiner* — Thomas E Worden
(74) *Attorney, Agent, or Firm* — Yee & Associates, P.C.

(57) ABSTRACT

An automatic braking system controller automatically decelerates an aircraft on a runway according to a brake-to-exit or a constant deceleration function. The automatic braking system controller determines whether the aircraft can decelerate to a selected velocity prior to reaching a target location along the runway. In response to determining that the aircraft can decelerate to the selected velocity prior to reaching the target location, the automatic braking system controller automatically decelerates the aircraft with a comfortable deceleration profile such that the aircraft reaches the selected velocity at the target location.

19 Claims, 11 Drawing Sheets

(56) References Cited

U.S. PATENT DOCUMENTS

| | | | |
|---|---|---|---|
| 2007/0241935 A1* | 10/2007 | Pepitone | G05D 1/0083 340/958 |
| 2008/0154445 A1 | 6/2008 | Goodman et al. | |
| 2010/0170981 A1* | 7/2010 | Belleville | B64C 25/36 244/58 |
| 2013/0197727 A1* | 8/2013 | Muller | B64C 19/00 701/16 |
| 2014/0012437 A1* | 1/2014 | Jones | B60T 8/1703 701/15 |
| 2014/0257601 A1* | 9/2014 | Horne | G01C 23/005 701/16 |
| 2015/0081142 A1* | 3/2015 | Henderson | B64D 45/04 701/16 |
| 2015/0120098 A1* | 4/2015 | Catalfamo | G08G 5/02 701/16 |
| 2017/0036776 A1* | 2/2017 | He | B64D 43/00 |
| 2017/0083206 A1* | 3/2017 | He | G06F 3/04817 |
| 2017/0183086 A1* | 6/2017 | Le-Bouedec | G08G 5/0013 |
| 2017/0305571 A1* | 10/2017 | Constans | B64D 43/00 |

FOREIGN PATENT DOCUMENTS

| | | | |
|---|---|---|---|
| CN | 105556248 A | 5/2016 | |
| EP | 0895929 A2 | 2/1999 | |

OTHER PUBLICATIONS

China National Intellectual Property Administration First Notice of Office Action and English translation, dated Feb. 20, 2021, regarding Application No. 201711072696.9, 16 pages.

\* cited by examiner

AUTOMATIC BRAKING SYSTEM CONTROLLER

BACKGROUND INFORMATION

1. Field

This disclosure relates to systems and methods for an automatic braking system for automatically decelerating an aircraft, and more specifically, to systems and methods for an automatic braking system for automatically decelerating an aircraft to reduce passenger discomfort, reduce thermal energy generation by the brake system, and reduce runway occupancy time of the aircraft.

2. Background

With the growth of air traffic, the aircraft ground traffic in airport areas is considerably intensified. Whether to get to a take-off runway entry from an embarkation point or to get to a debarkation point from a runway exit, the taxiing maneuvers in the airports today constitute difficult phases.

Various so-called "airport navigation" avionics functions have already been proposed to facilitate the movement on the ground of the aircraft in an airport context. For example, the map of the airport installations can be displayed on board, accompanied by relevant text information. This display can be complemented by various functions, such as zoom to enlarge sectors defined by the pilot or such as route functions. The position of the aircraft can also be displayed and alerts can be raised when the aircraft begins a dangerous maneuver, such as an unauthorized approach to a runway, or a non-regulatory maneuver, such as the entry onto a runway in the reverse direction. The position of the other aircrafts present on the site can also be displayed and anti-collision functions on the ground can be proposed.

Among the so-called "airport navigation" functions, the management of runway exits after landing to get to a taxiway is a critical task because it conditions both the good operation of the airport and the good operation of the aircraft. Runway occupancy times for landing that are longer than necessary are a source of waiting delays reading to an excess consumption of fuel for the aircraft in approach phase and a slowing down in the rate of landings.

Runway occupancy times that are longer than necessary are often caused by poor management of the runway exits. In practice, each landing runway has several exits, staged along the runway. Leaving the runway by taking one of the first exits reduces the occupancy time of the runway and also the quantity of fuel burnt in the landing phase, which not inconsiderable bearing in mind that for a flight of approximately one hour, the quantity of kerosene consumed in taxiing can represent approximately 5% of the total quantity of kerosene consumed. However, optimizing the runway exit is not easy, because there are numerous parameters involved: the state of the surface of the runway, weather conditions, the weight and condition of the aircraft, in particular of the tires and of the braking system. Such is, moreover, why the runway exit is never planned, simply suggested. Furthermore, it is not always desirable to apply maximum braking to take the first exit, since the energy to slow the aircraft would mostly be absorbed by the brakes which can lead to increased brake wear and may delay the departure time of the aircraft to allow for the brakes to cool below the required level prior to takeoff, both of which compromise the profitability of the aircraft.

The current solution consists of, for the pilot, after the nose landing gear has touched the ground, initially reversing the thrust of the engines. Then, in a second stage the pilot operates the brake pedals acting on the wheels. The runway exit is chosen at an educated guess by the pilot, who visually estimates the first exit that he can reach at a speed less than or equal to the maximum speed allowable to take the first exit safely and comfortably. The maximum allowable speed to take an exit is the speed above which taking the exit presents a risk given the angle that the exit forms with the runway. This angle can range at least up to 90 degrees and the maximum speed reduces as the angle increases. Quite often, the pilot is forced to add supplementary thrust to get to a more distant exit because it is extremely improbable to reach an exit just at the moment when its maximum allowable speed is reached. By this method, clearly the safety conditions are given priority. In particular, in the case of a supplementary thrust, the problems of excess consumption of kerosene and excessive occupancy of the runways are largely disregarded.

The pilot can also be assisted by an automatic braking system, called "auto-brake", which enables the pilot to select a deceleration level on an ascending scale ranging from 1 to 2, from 1 to 3, or from 1 to 5, depending on the aircraft model. The system is initialized immediately after the main landing gear has touched the ground and slows the aircraft to a complete stop in accordance with the deceleration level chosen by the pilot. The system is fixed and takes no account either of the particular landing conditions, such as the state of the runway, or the weather conditions, or of the speed of the aircraft when it touches down. It guarantees no stopping distance, which is variable even for a given deceleration level. It is up to the pilot to compensate for the lack of flexibility of the auto-brake system by taking over when he visually estimates that he can take an exit. For this, he simply has to operate the brake pedals to deactivate the system. The result is the same as for braking without the help of the auto-brake system: there is often a need to add supplementary thrust to get to a more distant exit. Economically, this solution is therefore not the best.

Moreover, during the landing, the pilot does not have any way of checking in advance that the length of runway remaining in front of the aircraft is sufficient to complete the landing without overshooting the end of the runway. The availability of such information enables the pilot to judge sufficiently in advance if it is wise to go around in order to try a new approach.

Therefore, it would be desirable to have a method and apparatus that take into account at least some of the issues discussed above, as well as other possible issues. Specifically, one issue is to find a method and apparatus for an auto-brake system that automatically decelerates an aircraft to enhance passenger comfort, reduces thermal energy generation by the brake system, and reduces runway occupancy time of the aircraft.

SUMMARY

An illustrative embodiment of the present disclosure provides a method for automatically decelerating an aircraft on a runway. A brake-to-exit function associated with an auto-brake system determines whether the aircraft can decelerate to a selected exit velocity prior to reaching a target location along a runway. In response to determining that the aircraft can decelerate to the selected exit velocity prior to reaching the target location, the auto-brake system automatically decelerates the aircraft such that the aircraft reaches the selected velocity at the target location.

Another illustrative embodiment of the present disclosure provides an auto-brake control system for controlling a brake system to automatically decelerate an aircraft on a runway. The auto-brake control system uses a brake-to-exit function to determine whether the aircraft can decelerate to a selected velocity prior to reaching a target location along a runway. In response to determining that the aircraft can decelerate to the selected velocity prior to reaching the target location, the auto-brake control system controls the brake system to automatically decelerate the aircraft such that the aircraft reaches the selected velocity at the target location.

A further illustrative embodiment of the present disclosure provides an aircraft comprising an auto-brake control system and flight management system having a graphical user interface. The auto-brake control system controls an auto-brake system to automatically decelerate the aircraft on a runway. A graphical user interface on the flight deck indicates a status of the brake-to-exit function of the auto-brake control system. When the status of the brake-to-exit function has been initialized as indicated by the graphical user interface, the auto-brake control system determines whether the aircraft can decelerate to a selected velocity prior to reaching a target location along a runway. In response to determining that the aircraft can decelerate to the selected velocity prior to reaching the target location, the auto-brake control system controls the brake system to automatically decelerate the aircraft such that the aircraft reaches the selected velocity at the target location.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account a number of different considerations. "A number of", as used herein with reference to items, means one or more items. For example, "a number of different considerations" means one or more different considerations.

The different illustrative embodiments recognize and take into account that, currently, an automatic braking system on an aircraft includes several modes of operation that are selectable by an operator. The different illustrative embodiments recognize and take into account that existing modes of operating the automatic braking system may increase passenger discomfort, generate excessive thermal energy by the brake system, and prolong runway occupancy time of the aircraft more than may be desirable.

The illustrative embodiments provide systems and methods for controlling an automatic braking system. In accordance with various embodiments, control logic for a brake-to-exit mode of operation of the automatic braking system is controlled by software. The control logic governing the operation of the automatic braking system may be separated from the device used to interact with the automatic braking system.

The illustrative embodiments provide systems and methods for controlling an automatic braking system. In accordance with illustrative embodiments, various displays and operator interfaces may be provided on the flight deck of an aircraft. The displays may indicate a brake-to-exit mode of the automatic braking system.

The displays may be controlled by an operator interface. The operator interface may be a device that the operator interacts with to provide input indicating a brake-to-exit mode of operation of the automatic braking system. For example, in various embodiments, the operator interface may be a touchscreen interface. Alternatively, in other embodiments, the operator interface may be a mechanical device that is movable by the operator to select the selected mode of operation. The operator interface may be separate and remote from the display.

Figure 1:
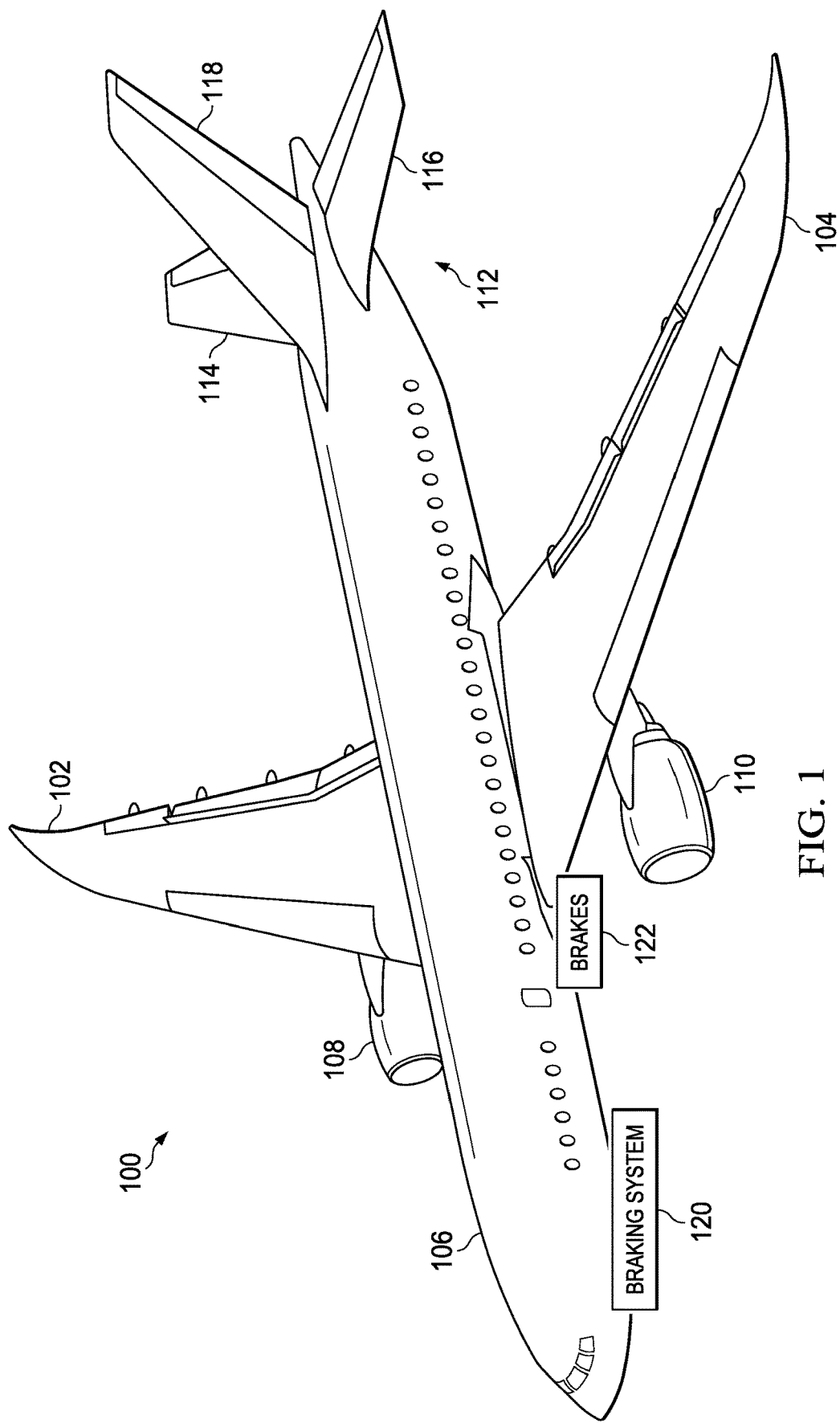
FIG. 1 is an illustration of an aircraft having a braking system including a brake-to-exit function in accordance with an illustrative embodiment.

With reference now to the figures, and in particular, with reference to FIG. 1, an illustration of an aircraft is depicted in accordance with an illustrative embodiment. Aircraft 100 may be a commercial passenger aircraft, a cargo aircraft, a rotorcraft, an airplane, a military aircraft, or any other type of aircraft.

In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 may include braking system 120 for performing various braking functions on aircraft 100. Braking system 120 may control the deceleration of aircraft 100. For example without limitation, braking system 120 may control the application of braking pressure to brakes 122 of aircraft 100 to control a rate of deceleration of aircraft 100. As another example, braking system 120 may control brakes 122 of aircraft 100 to slow aircraft 100 to a selected velocity. As another example, braking system 120 may control the operation of brakes 122 to slow aircraft 100 to a selected velocity before aircraft 100 reaches a target location along a runway, such as an exit location at which aircraft 100 should exit the runway.

Aircraft 100 is an example of an aircraft in which an auto-brake control system for controlling deceleration of an aircraft according to a brake-to exit function may be implemented in accordance with an illustrative embodiment.

This illustration of aircraft 100 is provided for purposes of illustrating one environment in which the different illustrative embodiments may be implemented. The illustration of aircraft 100 in FIG. 1 is not meant to imply architectural limitations to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable types of aircraft.

Figure 2:
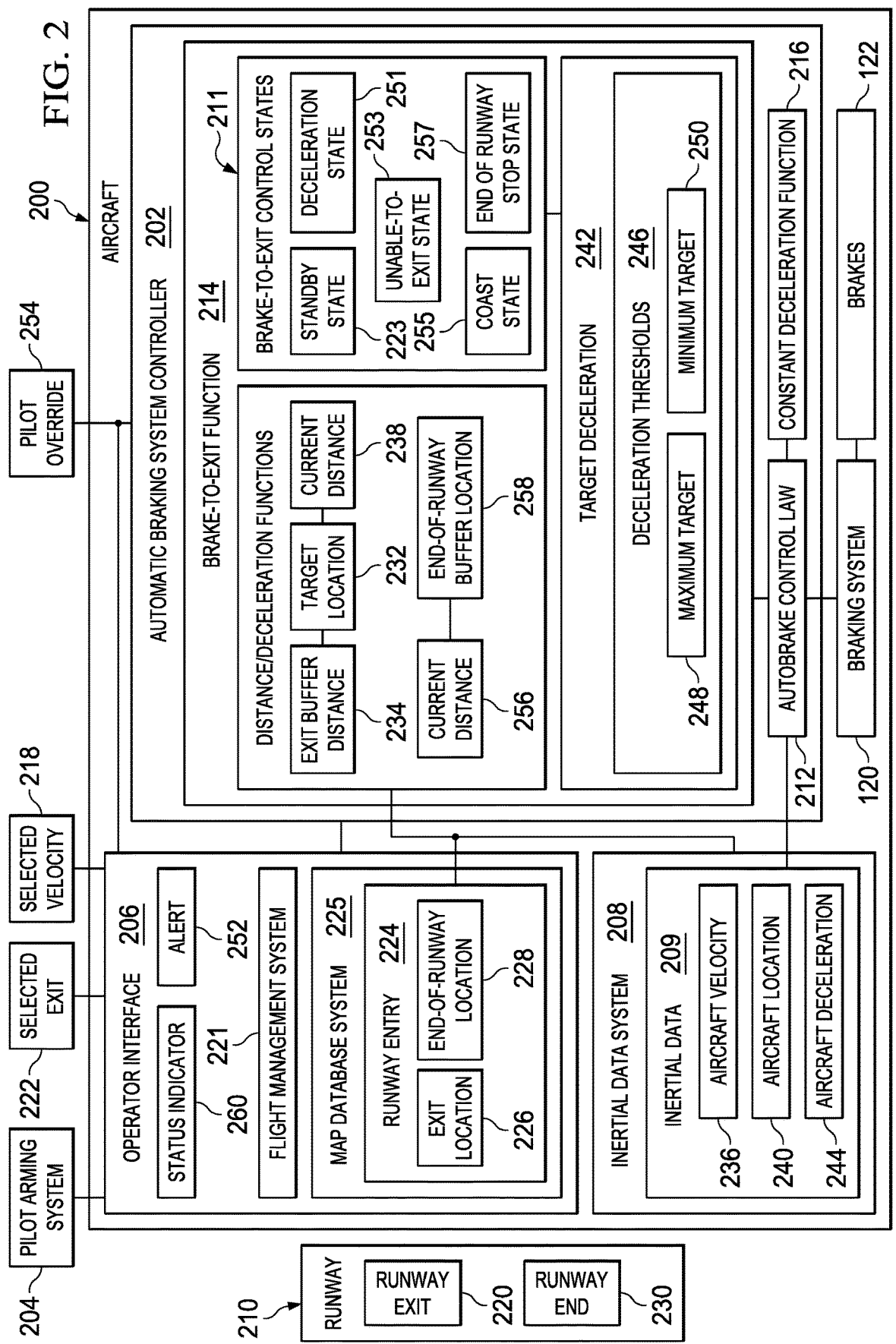
FIG. 2 is an illustration of a block diagram of an aircraft having an auto-brake system including a brake-to-exit function in accordance with an illustrative embodiment.

Turning now to FIG. 2, an illustration of a block diagram of an aircraft having an auto-brake control system including a brake-to-exit function is depicted in accordance with an illustrative embodiment. In the illustrative examples, the same reference numeral may be used in more than one figure. This reuse of a reference numeral in different figures represents the same element in the different figures. Aircraft 200 is an illustrative embodiment of aircraft 100 depicted in FIG. 1.

Aircraft 200 includes a number of different components. As depicted, aircraft 200 includes automatic braking system controller 202, pilot arming system 204, operator interface 206, and inertial data system 208.

Automatic braking system controller 202 controls operation of braking system 120 according to one of brake-to-exit control states 211 to automatically decelerate aircraft 200 along runway 210. Automatic braking system controller 202 includes autobrake control law 212. Autobrake control law 212 generates an auto-brake command output to braking system 120 and brakes 122 to automatically decelerate aircraft 200 along runway 210 according to a number of selectable braking functions including at least one of brake-to-exit function 214 and constant deceleration function 216.

In this illustrative example, automatic braking system controller 202 may be operated according to a number of selectable braking functions, brake-to-exit function 214 and constant deceleration function 216. Automatic braking system controller 202 may be embodied as a software application. Automatic braking system controller 202 may include software control logic to control the operation of braking system 120 to automatically decelerate aircraft 200 according to the selected operating mode.

In this illustrative example, brake-to-exit function 214 is one of a number of selectable braking functions for operating automatic braking system controller 202. When automatic braking system controller 202 is embodied as a software application, brake-to-exit function 214 is software control logic for controlling the operation of braking system 120 to automatically decelerate aircraft 200 such that aircraft 200 tends to decelerate to selected velocity 218 prior to reaching runway exit 220 along runway 210.

Aircraft 200 includes pilot arming system 204. An operator of aircraft 200 can initialize brake-to-exit function 214 by entering parameters, such as selected velocity 218 and selected exit 222, into pilot arming system 204. When initialized, brake-to-exit function 214 enters standby state 223 when an operator of aircraft 200 activates automatic braking system controller 202.

In this illustrative example, selected velocity 218 corresponds to a taxi speed, or runway exit speed, of aircraft 200. Because selected velocity 218 is selectable by an operator of aircraft 200, selected velocity 218 allows for a higher taxi speed when runway exit 220 is a high-speed exit near a touchdown zone of runway 210. In one illustrative embodiment, selected velocity 218 is a default velocity of about 15 knots.

In this illustrative example, runway 210 corresponds to runway entry 224 of map database system 225. Map database system 225 is a database or other data structure that includes location information for runways, including runway 210. As depicted, runway entry 224 includes exit location 226 and end-of-runway location 228. Exit location 226 is location information, such as global positioning coordinate information, that uniquely identifies the location of runway exit 220. End-of-runway location 228 is location information, such as global positioning coordinate information, that uniquely identifies the location of runway end 230.

Based on exit location 226, brake-to-exit function 214 determines target location 232. Target location 232 is location information, such as global positioning coordinate information, that uniquely identifies a desired location along runway 210 at which aircraft 200 should reach selected velocity 218.

In an illustrative example, brake-to-exit function 214 determines target location 232 by subtracting exit buffer distance 234 from exit location 226. Exit buffer distance 234 is a length of runway 210 that, after decelerating to selected velocity 218, allows an operator of aircraft 200 to become accustomed to aircraft velocity 236 prior to exiting runway 210. Exit buffer distance 234 is selected based on a preference of how far away from runway exit 220 that aircraft velocity 236 of aircraft 200 should reach selected velocity 218.

In an illustrative example, decelerating to selected velocity 218 at target location 232 avoids calculation errors and rapid deceleration fluctuations as current distance 238 between aircraft 200 and exit location 226 approaches zero. Therefore, decelerating to selected velocity 218 at target location 232 allows for a smoother deceleration profile as aircraft 200 approaches target location 232 on runway 210.

Current distance 238 is a distance between aircraft location 240 and target location 232. Aircraft location 240 is location information, such as global positioning coordinate information, that uniquely identifies the location of aircraft 200. Aircraft location 240 is computed within inertial data system 208 from on-board sensors, such as a global positioning system. Based on target location 232 and aircraft location 240, brake-to-exit function 214 calculates current distance 238.

When automatic braking system controller 202 controls operation of braking system 120 according to brake-to-exit function 214, automatic braking system controller 202 determines whether aircraft 200 can decelerate to selected velocity 218 prior to reaching target location 232. If automatic braking system controller 202 determines that aircraft 200 can decelerate to selected velocity 218 prior to reaching target location 232, automatic braking system controller 202 controls operation of braking system 120 to automatically decelerate aircraft 200 such that aircraft 200 reaches selected velocity 218 when aircraft 200 reaches target location 232.

In another illustrative example, automatic braking system controller 202 automatically decelerates aircraft 200 at a comfortable deceleration level by continuously adjusting target deceleration 242 to ensure aircraft 200 reaches selected velocity 218 at target location 232.

Target deceleration 242 is a deceleration necessary to decelerate aircraft 200 such that aircraft 200 reaches selected velocity 218 when aircraft location 240 reaches target location 232. Brake-to-exit function 214 iteratively determines and adjusts target deceleration 242 based on selected velocity 218, aircraft location 240, aircraft velocity 236, and current distance 238. Brake-to-exit function 214 provides target deceleration 242 to auto-brake control law 212 in automatic braking system controller 202. Based on aircraft deceleration 244 and target deceleration 242, autobrake control law 212 generates an auto-brake command output to braking system 120 and brakes 122 such that aircraft 200 comfortably decelerates to selected velocity 218 when aircraft location 240 reaches target location 232.

In one illustrative example, brake-to-exit function 214 comfortably decelerates aircraft 200 to selected velocity 218 by providing deceleration thresholds 246 for target deceleration 242. Deceleration thresholds 246 delimit a preferred deceleration range for aircraft 200 based on at least one of passenger comfort, thermal energy generation, runway dwell time, or combinations thereof.

As depicted, deceleration thresholds 246 include maximum target 248 and minimum target 250. Maximum target 248 is a maximum threshold for target deceleration 242. In one illustrative example, maximum target 248 may be a deceleration of about 7.5 ft/s$^2$ (7.5 feet per second squared). Minimum target 250 is a minimum threshold for target deceleration 242. In one illustrative example, minimum target 250 may be a deceleration of about 5 ft/s$^2$ (5 feet per second squared).

In another illustrative example, automatic braking system controller 202 monitors aircraft location 240 and aircraft velocity 236 to calculate the target deceleration 242. When target deceleration 242 exceeds minimum target 250 of aircraft 200, brake-to-exit function 214 enters deceleration state 251. In deceleration state 251, brake-to-exit function 214 provides target deceleration 242 to auto-brake control law 212 in automatic braking system controller 202. Based aircraft deceleration 244 and target deceleration 242, autobrake control law 212 generates an auto-brake command output to braking system 120 and brakes 122 such that aircraft 200 comfortably decelerates to selected velocity 218 when aircraft location 240 reaches target location 232.

While automatic braking system controller 202 monitors aircraft location 240 and aircraft velocity 236 in standby state 223, aircraft 200 may experience passive deceleration. As used herein, passive deceleration is a portion of aircraft deceleration 244 based on at least one of aircraft drag, thrust reversers, spoilers, and combinations thereof, without application of brakes 122. Passive deceleration is typically less than minimum target 250. Because brake-to-exit function 214 does not actively decelerate aircraft 200 until target deceleration 242 reaches minimum target 250, brake-to-exit function 214 allows aircraft 200 to take advantage of longer runway lengths where runway exit 220 is farther away from a touchdown zone for runway 210. Because brake-to-exit function 214 does not actively decelerate aircraft 200 until target deceleration 242 reaches minimum target 250, brake-to-exit function 214 reduces thermal energy generation of brakes 122. Additionally, because aircraft 200 passively decelerates at a rate less than minimum target 250, brake-to-exit function 214 reduces the runway occupancy time of aircraft 200 because brake-to-exit function 214 does not actively decelerate aircraft 200 until target deceleration 242 reaches minimum target 250.

In another illustrative example, if automatic braking system controller 202 determines that aircraft 200 cannot decelerate to selected velocity 218 prior to reaching target location 232, or cannot comfortably decelerate to selected velocity 218 without exceeding maximum target 248, prior to reaching target location 232, brake-to-exit function 214 enters unable-to-exit state 253. Operator interface 206 displays alert 252 that aircraft 200 cannot comfortably decelerate to selected velocity 218 prior to reaching target location 232. In unable-to-exit state 253, brake-to-exit function 214 provides target deceleration 242, set at minimum target 250, to auto-brake control law 212 in automatic braking system controller 202. Autobrake control law 212 generates an auto-brake command output to braking system 120 and brakes 122 such that aircraft 200 comfortably decelerates to selected velocity 218 when aircraft location 240 reaches target location 232.

In this manner, when brake-to-exit function 214 determines that aircraft 200 cannot decelerate to selected velocity 218 prior to reaching target location 232, brake-to-exit function 214 ignores exit location 226 of the previously designated selected exit 222, and alerts the operator of aircraft 200 that aircraft 200 is unable to exit runway 210 at runway exit 220. The alert can be provided as alert 252, displayed on operator interface 206 of aircraft 200. Operator interface 206 may be a device through which the operator of aircraft 200 interacts with automatic braking system controller 202. For example, in various embodiments, the operator interface may be a touchscreen interface. Alternatively, in other embodiments, alert 252 can be provided on the flight deck of aircraft 200 as an alert, such as a light or other indicator.

Continuing with the current example, when brake-to-exit function 214 determines that aircraft 200 cannot decelerate to selected velocity 218 prior to reaching target location 232, brake-to-exit function 214 provides target deceleration 242, set at minimum target 250, to auto-brake control law 212 in automatic braking system controller 202. Autobrake control law 212 generates an auto-brake command output to braking system 120 and brakes 122 such that aircraft 200 comfortably decelerates to selected velocity 218 at a location on runway 210 beyond target location 232. In this manner, brake-to-exit function 214 ensures that aircraft 200 decelerates to selected velocity 218 in a manner that reduces passenger discomfort, thermal energy generation by brakes 122, and runway occupancy time of aircraft 200 on runway 210.

In another illustrative example, after aircraft 200 has decelerated to selected velocity 218, brake-to-exit function 214 enters coast state 255. In coast state 255, brake-to-exit function 214 maintains selected velocity 218 until pilot override 254 is received, disarming automatic braking system controller 202. Pilot override 254 is any action taking by an operator of aircraft 200 that overrides control of braking system 120 by automatic braking system controller 202. Pilot override 254 can be, for example but not limited to, manual operation of brakes 122, increasing thrust to engines, such as engines 108 and 110, illustrated in FIG. 1, and deactivating brake-to-exit function 214.

By maintaining selected velocity 218 until pilot override 254 is received, brake-to-exit function 214 ensures that aircraft 200 maintains selected velocity 218 by, for example, compensating for any residual thrust from engines, such as engines 108 and 110, illustrated in FIG. 1. In this manner, brake-to-exit function 214 ensures that aircraft 200 continues along the runway 210 at selected velocity 218, reducing runway occupancy time of aircraft 200 on runway 210.

In another illustrative example, automatic braking system controller 202 automatically decelerates aircraft 200 by determining current distance 256 between aircraft location 240 and end-of-runway location 228. If brake-to-exit function 214 determines that aircraft 200 has passed end-of-runway buffer location 258, brake-to-exit function 214 enters end of runway stop state 257. In end of runway stop state 257, brake-to-exit function 214 controls of rate control law 212 and braking system 120 to automatically decelerate aircraft 200 from selected velocity 218, targeting target deceleration 242 or beyond, such that aircraft 200 stops prior to overrunning runway end 230.

Brake-to-exit function 214 calculates current distance 256 based on an aircraft location 240 provided from Inertial Data System 208. End-of-runway buffer location 258 is a location along runway 210, sufficiently removed from runway end 230, selected such that aircraft 200 decelerates to a full stop prior to overrunning runway end 230. In the absence of pilot override 254 disarming braking system 120, brake-to-exit function 214 controls operation of braking system 120 such that aircraft 200 decelerates to a full stop when aircraft 200 has passed end-of-runway buffer location 258. In this manner, brake-to-exit function 214 prevents aircraft 200 from inadvertently overrunning runway end 230.

In another illustrative example, operator interface 206 includes status indicator 260. Status indicator 260 is an indication displayed on operator interface 206 indicating at least a status of brake-to-exit function 214. When status indicator 260 indicates a selection of brake-to-exit function 214, brake-to-exit function 214 controls the operation of braking system 120 to automatically decelerate aircraft 200 such that aircraft 200 reaches selected velocity 218 at target location 232.

The illustration of aircraft 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
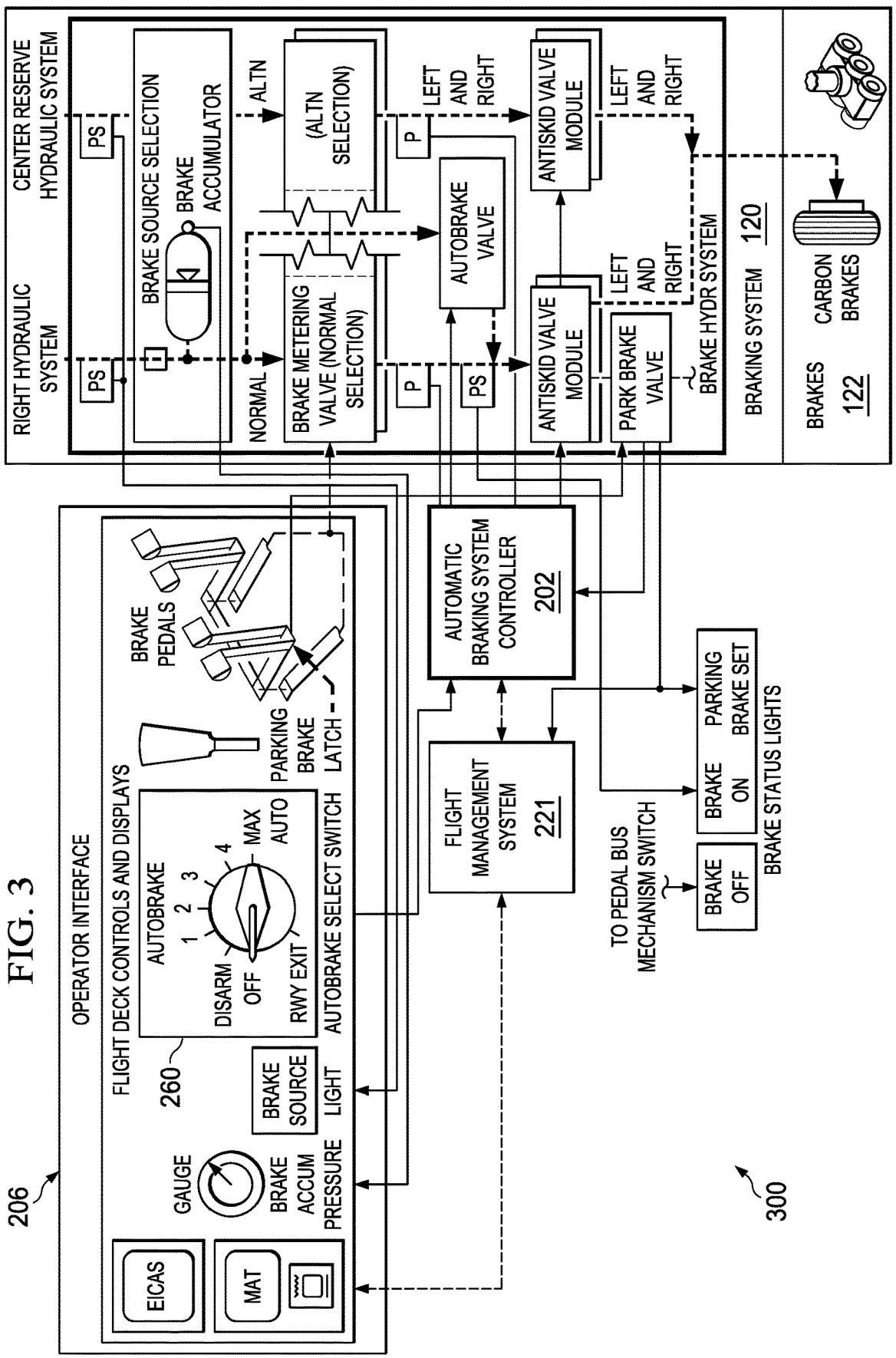
FIG. 3 is an illustration of a schematic for a brake system and associated flight deck controls implemented in accordance with an illustrative embodiment.

Turning now to FIG. 3, an illustration of a schematic for a hydraulic brake system and associated flight deck controls implemented in accordance with an illustrative embodiment. Schematic 300 is a diagram illustrating the interaction and data flow between various brake system components of aircraft 200 of FIG. 2.

Schematic 300 is a schematic for a hydraulic brake system. However, schematic 300 is not meant to imply architectural limitations to the manner in which different illustrative embodiments may be implemented. For example, automatic braking system controller 202, including brake-to-exit function 214, can also apply to in an aircraft having an electric brake system.

In this illustrative example, operator interface 206 includes flight deck controls and displays for automatically decelerating an aircraft, such as aircraft 200 of FIG. 2, to a selected velocity, such as selected velocity 218 of FIG. 2, at a target location, such as target location 232 of FIG. 2.

As illustrated, operator interface 206 includes status indicator 260. When status indicator 260 indicates a selection of brake-to-exit function 214, as shown in FIG. 2, brake-to-exit function 214 provides target deceleration 242 to auto-brake control law 212 in automatic braking system controller 202. Based on aircraft deceleration 244 and target deceleration 242, autobrake control law 212 generates an auto-brake command output to braking system 120 and brakes 122 such that aircraft 200 comfortably decelerates to selected velocity 218 when aircraft location 240 reaches target location 232.

As illustrated, brake-to-exit function 214 receives inertial data 209 from inertial data system 208, shown in block form in FIG. 2. Based on receiving inertial data 209 from flight management system 221, brake-to-exit function 214 can determine target deceleration 242 for aircraft 200, current distance 238, and current distance 256, all shown in FIG. 2. Based on data received from flight management system 221, map database system 225 and inertial data system 208, automatic braking system controller 202, operating according to brake-to-exit function 214, ensures that aircraft 200 decelerates to selected velocity 218, shown in block form in FIG. 2, before reaching a target location along a runway, such as target location 232 of runway 210 both shown in block form in FIG. 2.

Figure 4:
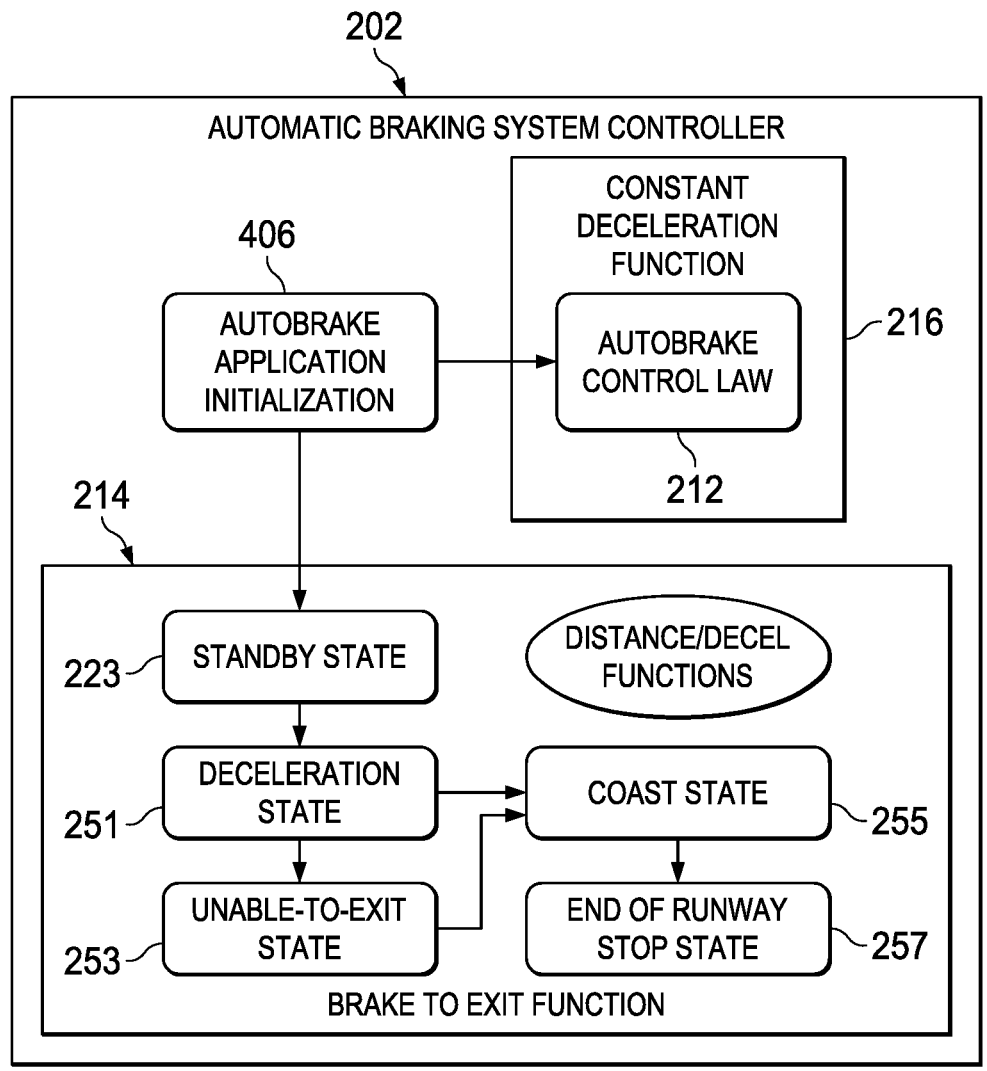
FIG. 4 is an illustration of a number of control states and control logic for an auto-brake system including a brake-to-exit function in accordance with an illustrative embodiment.

With reference now to FIG. 4, an illustration of a number of control states and control logic for an autobrake system including a brake-to-exit function is shown in accordance with an illustrative embodiment. As illustrated, control states illustrated in FIG. 4 are control states 211 for brake-to-exit function 214, both shown in block form in FIG. 2.

Autobrake application initialization 406 is initialized when braking system 120 of FIG. 2 can be utilized for a landing. When autobrake application initialization 406 is active, an operator can initiate brake-to-exit function 214, or constant deceleration function 216. As shown in FIG. 2, an operator can initiate brake-to-exit function 214 by entering selected velocity 218 and selected exit 222 in operator interface 206.

When operator of an aircraft has applied the automatic braking system, such as braking system 120 of FIG. 2, and indicated a runway exit location, such as exit location 226 of runway 210, both shown in FIG. 2, brake-to-exit function 214 is initialized, as shown in autobrake application initialization 406, and waits for touchdown of aircraft 200. Brake-to-exit function 214 then enters standby state 223.

In standby state 223, brake-to-exit function 214 allows aircraft 200 to passively decelerate until target deceleration 242 exceeds minimum target 250, both shown in block form in FIG. 2. Automatic braking system controller 202 monitors aircraft location 240 and aircraft velocity 236 to calculate the target deceleration 216. When target deceleration 216 exceeds minimum target 250 of aircraft 200, brake-to-exit function 214 enters deceleration state 251. In deceleration state 251, brake-to-exit function 214 provides target deceleration 242 to auto-brake control law 212 in automatic braking system controller 202. Based aircraft deceleration 244 and target deceleration 242, autobrake control law 212 generates an auto-brake command output to braking system 120 and brakes 122 such that aircraft 200 comfortably decelerates to selected velocity 218 when aircraft location 240 reaches target location 232. By passively decelerating aircraft 200, brake-to-exit function 214 allows aircraft 200 to take advantage of longer runway lengths where runway exit 220 is farther away from a touchdown zone for runway 210.

During standby state 223, brake-to-exit function 214 iteratively determines target deceleration 242 required to decelerate aircraft 200 to selected velocity 218 at target location 232. When brake-to-exit function 214 determines that target deceleration 242 exceeds minimum target 250 of aircraft 200, brake-to-exit function 214 enters deceleration state 251.

In deceleration state 251, brake-to-exit function 214 controls braking system 120 to decelerate aircraft 200 such that aircraft 200 reaches selected velocity 218 at target location 232. During deceleration state 251, brake-to-exit function 214 iteratively determines target deceleration 242 and issues commands to autobrake control law 212 to adjust application of brakes 122 by braking system 120 such that aircraft 200 reaches selected velocity 218 at target location 232.

If brake-to-exit function 214 determines that target deceleration 242 exceeds maximum target 248, brake-to-exit function 214 enters unable-to-exit state 253. According to this illustrative example, unable-to-exit state 253 is activated when brake-to-exit function 214 determines that aircraft 200 cannot comfortably decelerate to selected velocity 218 prior to reaching target location 232.

When brake-to-exit function 214 enters unable-to-exit state 253, Operator interface 206 displays alert 252 that aircraft 200 cannot comfortably decelerate to selected velocity 218 prior to reaching target location 232. In unable-to-exit state 253, brake-to-exit function 214 provides target deceleration 242, set at minimum target 250, to auto-brake control law 212 in automatic braking system controller 202. Autobrake control law 212 generates an auto-brake command output to braking system 120 and brakes 122 such that aircraft 200 comfortably decelerates to selected velocity 218 when aircraft location 240 reaches target location 232. When aircraft 200 reaches selected velocity 218, brake-to-exit function 214 enters coast state 255. In coast state 255, brake-to-exit function 214 maintains selected velocity 218 until pilot override 254 is received, disarming automatic braking system controller 202. Pilot override 254 is any action taking by an operator of aircraft 200 that overrides control of braking system 120 by automatic braking system controller 202. Pilot override 254 can be, for example but not limited to, manual operation of brakes 122, increasing thrust to engines, such as engines 108 and 110, illustrated in FIG. 1, and deactivating brake-to-exit function 214.

Brake-to-exit function 214 continuously monitors current distance 238 between aircraft location 240 and end-of-runway location 228. If brake-to-exit function 214 determines that aircraft 200 has passed end-of-runway buffer location 258, brake-to-exit function 214 transitions to end of runway stop state 257.

In end of runway stop state 257, brake-to-exit function 214 controls of rate control law 212 and braking system 120 to automatically decelerate aircraft 200 from selected velocity 218, targeting target deceleration 242 or beyond, such that aircraft 200 stops prior to overrunning runway end 230.

Brake-to-exit function 214 calculates current distance 256 based on an aircraft location 240 provided from inertial data system 208. End-of-runway buffer location 258 is a location along runway 210, sufficiently removed from runway end 230, selected such that aircraft 200 decelerate to a full stop prior to overrunning runway end 230. In the absence of pilot override 254 disarming braking system 120, brake-to-exit function 214 controls operation of braking system 120 such that aircraft 200 decelerates to a full stop when aircraft 200 has passed end-of-runway buffer location 258. In this manner, brake-to-exit function 214 prevents aircraft 200 from inadvertently overrunning runway end 230. During any control state of brake-to-exit function 214, any action taken by operator of aircraft 200 that overrides control of braking system 120 causes brake-to-exit function 214 to cede control of braking system 120. Brake-to-exit function 214 exits, allowing for manual control of brakes 122. In this illustrative example, an action taken by operator of aircraft 200 that overrides control of braking system 120 may be pilot override 254, shown in FIG. 2. Pilot override 254 can be, for example but not limited to, manual operation of brakes 122 and increasing thrust to engines, such as engines 108 and 110, illustrated in FIG. 1.

Figure 5:
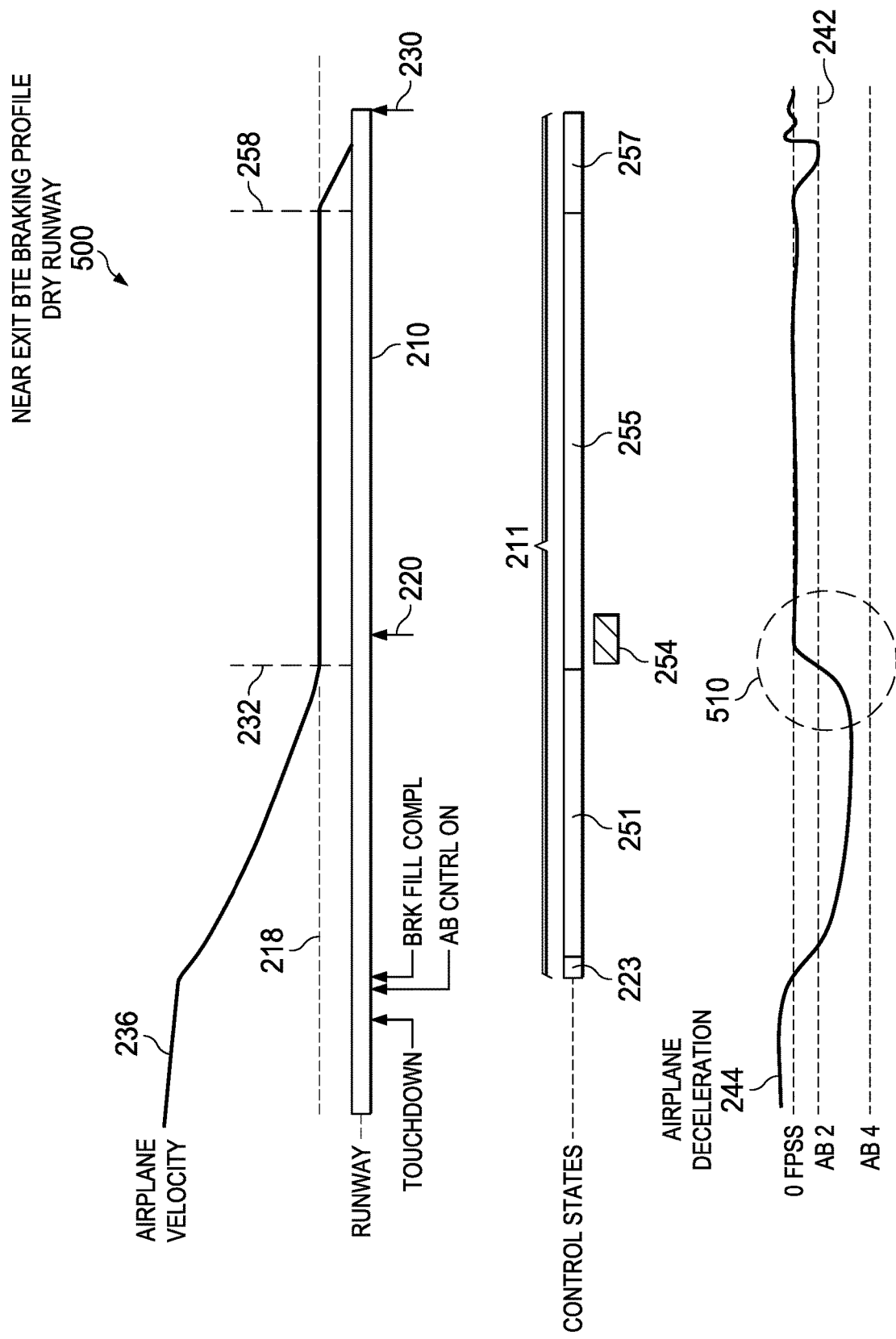
FIG. 5 is an illustration of an example of a near exit braking profile for an auto-brake system including a brake-to-exit function in accordance with an illustrative embodiment.

Referring now to FIG. 5, an illustration of an example of a near exit braking profile for an auto-brake system including a brake-to-exit function in accordance with an illustrative embodiment. Braking profile 500 is first example of a braking profile utilizing a brake-to-exit function, such as brake-to-exit function 214 shown in block form in FIG. 2.

When initialized, brake-to-exit function 214 waits for touchdown along runway 210. Brake-to-exit function 214 then enters standby state 223.

In standby state 223, deceleration 244 is passive, based on at least one of aircraft drag, thrust reversers, spoilers, and combinations thereof, without application of brakes 122. During standby state 223, brake-to-exit function 214 iteratively determines target deceleration 242 required to decelerate aircraft 200 to selected velocity 218 at target location 232. When brake-to-exit function 214 determines that target deceleration 242 exceeds minimum target 250, brake-to-exit function 214 enters deceleration state 251.

In deceleration state 251, brake-to-exit function 214 controls deceleration 244 such that velocity 236 of aircraft 200 reaches selected velocity 218 at target location 232. During deceleration state 251, brake-to-exit function 214 iteratively determines target deceleration 242 and sends commands to autobrake control law 212 to adjust the application of brakes 122 by braking system 120 such that aircraft 200 reaches selected velocity 218 at target location 232.

In an illustrative example, decelerating to selected velocity 218 at target location 232 avoids calculation errors and rapid deceleration fluctuations as current distance 238 between aircraft 200 and runway exit 220 approaches zero. Therefore, decelerating to selected velocity 218 at target location 232 allows for a smoother deceleration profile 510 as aircraft 200 approaches target location 232.

When aircraft 200 reaches selected velocity 218, brake-to-exit function 214 enters coast state 255. While in coast state 255, brake-to-exit function 214 maintains selected velocity 218. Brake-to-exit function 214 ensures that aircraft 200 maintains selected velocity 218 by, for example, compensating for any residual thrust from engines, such as engines 108 and 110, illustrated in FIG. 1.

In the absence of a pilot override, such as pilot override 254, brake-to-exit function 214 transitions to end of runway stop state 257 when aircraft 200 has passed end-of-runway buffer location 258. When in end of runway stop state 257, brake-to-exit function 214 automatically decelerates aircraft 200 from selected velocity 218 such that aircraft 200 stops prior to runway end 230.

Figure 6:
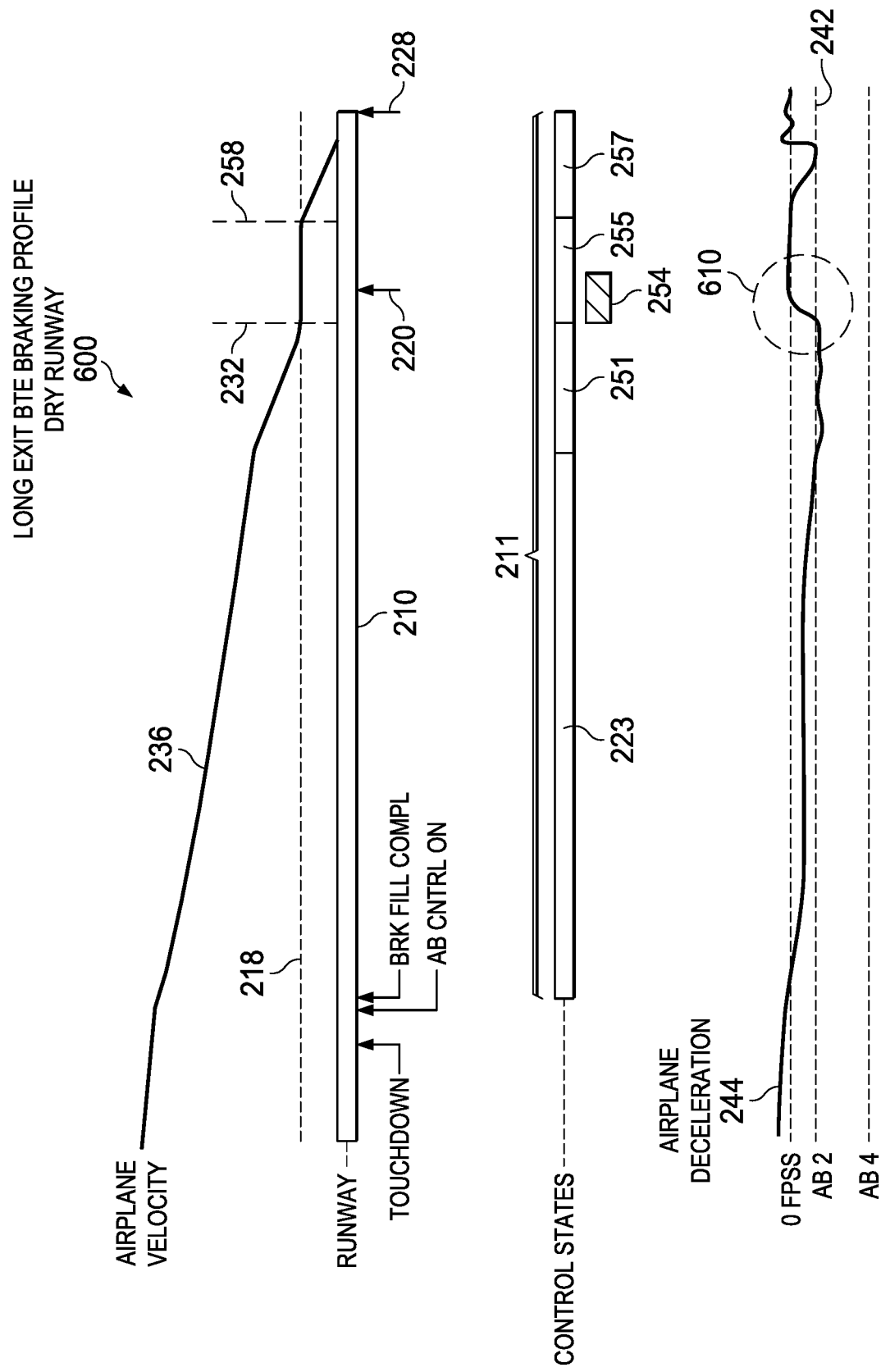
FIG. 6 is an illustration of an example of a long distance exit braking profile for an auto-brake system including a brake-to-exit function in accordance with an illustrative embodiment.

Referring now to FIG. 6, an illustration of an example of a long exit braking profile for an auto-brake system including a brake-to-exit function in accordance with an illustrative embodiment. Braking profile 600 is first example of a braking profile utilizing a brake-to-exit function, such as brake-to-exit function 214 shown in block form in FIG. 2.

When initialized, brake-to-exit function 214 waits for touchdown along runway 210. Brake-to-exit function 214 then enters standby state 223.

In standby state 223, deceleration 244 is passive, based on at least one of aircraft drag, thrust reversers, spoilers, and combinations thereof, without application of brakes 122. During standby state 223, brake-to-exit function 214 iteratively determines target deceleration 242 required to decelerate aircraft 200 to selected velocity 218 at target location 232. Because deceleration 244 is passive and less than minimum target 250, braking profile 600 allows aircraft 200 to take advantage of the longer length of runway 210, where location of runway exit 220 is farther away from a touchdown zone for runway 210. By passively decelerating aircraft 200, braking profile 600 reduces thermal energy generation of brakes 122. Additionally, because aircraft 200 decelerates slower than minimum target 250, brake-to-exit function 214 reduces the occupancy time of aircraft 200 on runway 210.

During standby state 223, brake-to-exit function 214 iteratively determines target deceleration 242 required to decelerate aircraft 200 to selected velocity 218 at target location 232. When brake-to-exit function 214 determines that target deceleration 242 exceeds minimum target 250, brake-to-exit function 214 enters deceleration state 251.

In deceleration state 251, brake-to-exit function 214 controls deceleration 244 such that velocity 236 of aircraft 200 reaches selected velocity 218 at target location 232. During deceleration state 251, brake-to-exit function 214 iteratively determines target deceleration 242 and sends commands to autobrake control law 212 to adjust the application of brakes 122 by braking system 120 such that aircraft 200 reaches selected velocity 218 at target location 232.

Braking profile 600 takes advantage of the longer length of runway 210 by ensuring that deceleration 244 does not exceed minimum target 250. According to braking profile 600, minimum target 250 is determined based on at least one of passenger comfort, thermal energy generation, runway dwell time, or combinations thereof. According to braking profile 600, minimum target 250 corresponds to target deceleration 242 of about 5 ft/s$^2$ (5 feet per second squared).

In this illustrative example, selected velocity 218 corresponds to a taxi speed of aircraft 200, and can be a default velocity of about 15 knots. Runway exit 220 is a location along runway 210 at which aircraft 200 should exit runway 210 according to selected exit 222. Brake-to-exit function 214 then determines target location 232 by subtracting exit buffer distance 234 from exit location 226.

In an illustrative example, decelerating to selected velocity 218 at target location 232 avoids calculation errors and rapid deceleration fluctuations as current distance 238 between aircraft 200 and runway exit 220 approaches zero. Therefore, decelerating to selected velocity 218 at target location 232 allows for a smoother deceleration profile 610 as aircraft 200 approaches target location 232.

When aircraft 200 reaches selected velocity 218, brake-to-exit function 214 enters coast state 255. While in coast state 255, brake-to-exit function 214 maintains selected velocity 218. Brake-to-exit function 214 ensures that aircraft 200 maintains selected velocity 218 by, for example, compensating for any residual thrust from engines, such as engines 108 and 110, illustrated in FIG. 1.

In the absence of a pilot override, such as pilot override 254, brake-to-exit function 214 transitions to end of runway stop state 257 when aircraft 200 has passed end-of-runway buffer location 258. When in end of runway stop state 257, brake-to-exit function 214 automatically decelerates aircraft 200 from selected velocity 218 such that aircraft 200 stops prior to runway end 230.

Figure 7:
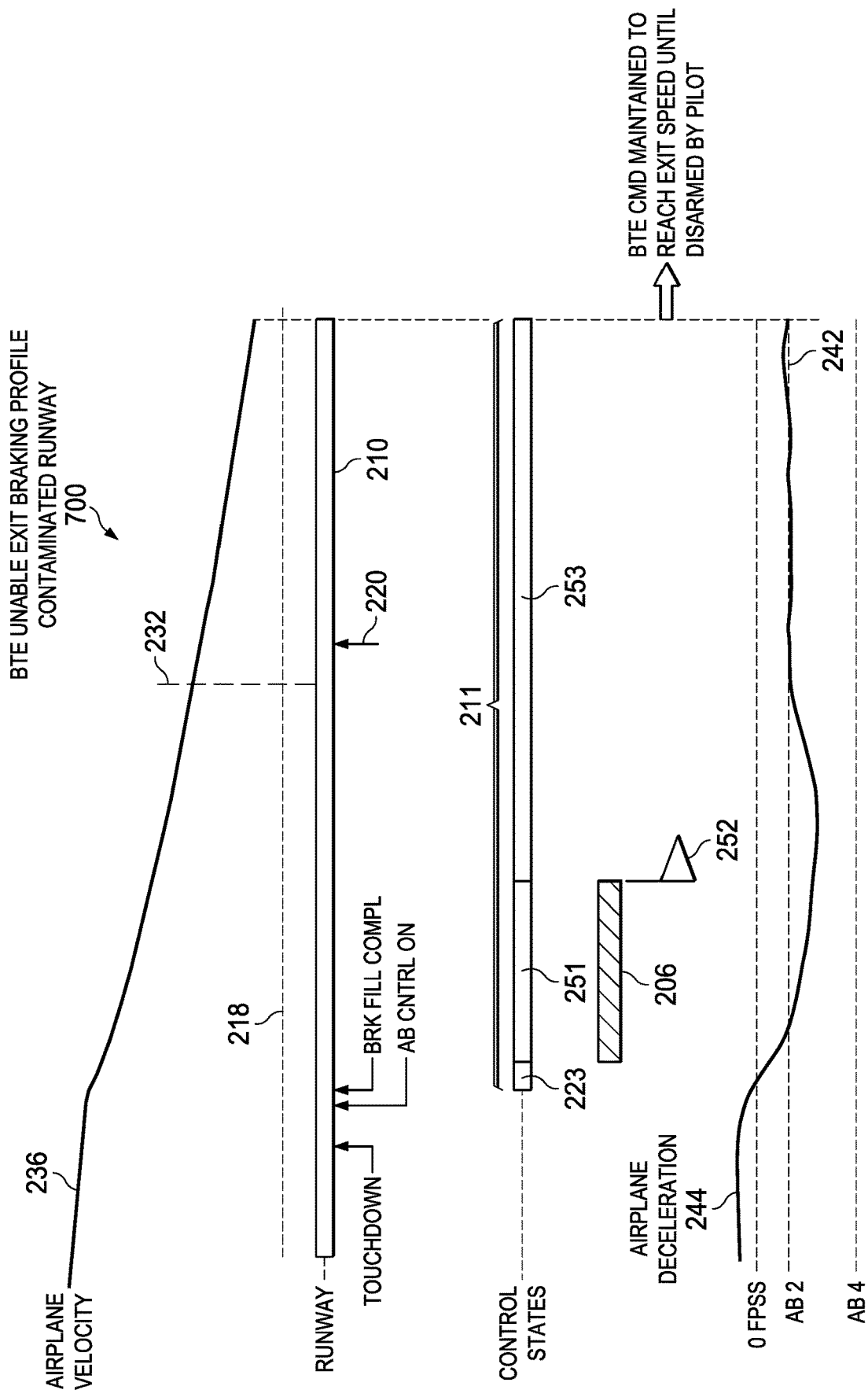
FIG. 7 is an illustration of an example of an unable-to-exit distance braking profile for an auto-brake system including a brake-to-exit function in accordance with an illustrative embodiment

Referring now to FIG. 7, an illustration of an example of a near exit braking profile for an auto-brake system including a brake-to-exit function in accordance with an illustrative embodiment. Braking profile 700 is an example of a braking profile utilizing a brake-to-exit function, such as brake-to-exit function 214 shown in block form in FIG. 2.

When initialized, brake-to-exit function 214 waits for touchdown along runway 210. Brake-to-exit function 214 then enters standby state 223.

In standby state 223, deceleration 244 is passive, based on at least one of aircraft drag, thrust reversers, spoilers, and combinations thereof, without application of brakes 122. During standby state 223, brake-to-exit function 214 iteratively determines target deceleration 242 required to decelerate aircraft 200 to selected velocity 218 at target location 232. When brake-to-exit function 214 determines that target deceleration 242 exceeds minimum target 250, brake-to-exit function 214 enters deceleration state 251.

In deceleration state 251, brake-to-exit function 214 controls deceleration 244 such that velocity 236 of aircraft 200 reaches selected velocity 218 at target location 232. During deceleration state 251, brake-to-exit function 214 iteratively determines target deceleration 242 and sends commands to autobrake control law 212 to adjust the application of brakes 122 by braking system 120 such that aircraft 200 reaches selected velocity 218 at target location 232.

Brake-to-exit function 214 determines that aircraft 200 cannot decelerate to selected velocity 218 prior to reaching target location 232, or cannot comfortably decelerate to selected velocity 218 without exceeding maximum target 248 prior to reaching target location 232. Therefore, brake-to-exit function 214 enters unable-to-exit state 253.

In unable-to-exit state 253, operator interface 206 displays alert 252 that aircraft 200 cannot comfortably decelerate to selected velocity 218 prior to reaching target location 232. In unable-to-exit state 253, brake-to-exit function 214 provides target deceleration 242, set at minimum target 250, to auto-brake control law 212 in automatic braking system controller 202. Autobrake control law 212 generates an auto-brake command output to braking system 120 and brakes 122 such that aircraft 200 comfortably decelerates to selected velocity 218 when aircraft location 240 reaches target location 232.

Figure 8:
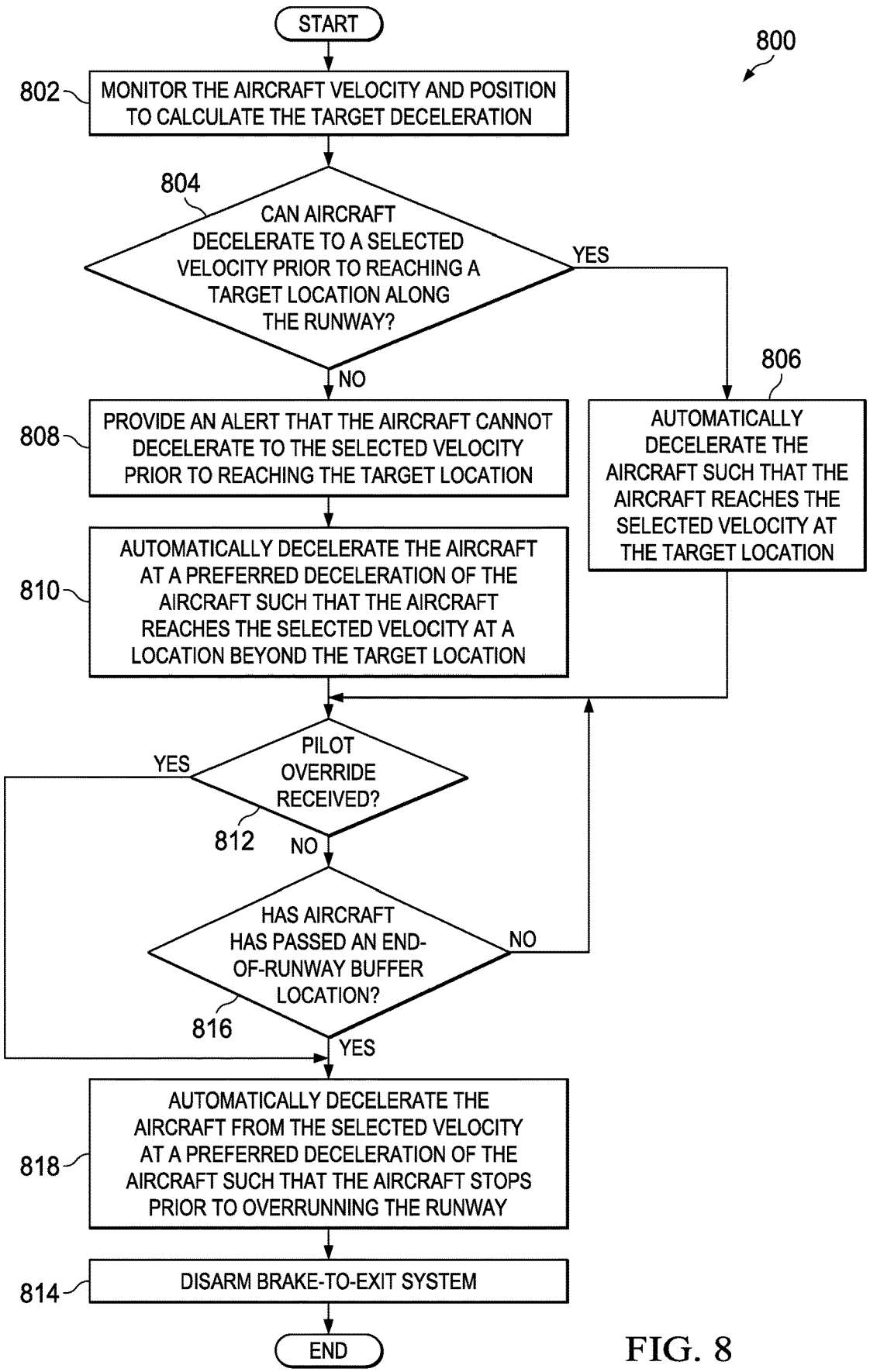
FIG. 8 is an illustration of a flowchart of a process for automatically decelerating an aircraft on a runway using an auto-brake control system having a brake-to-exit function in accordance with an illustrative embodiment.

Referring now to FIG. 8, an illustration of a flowchart of a process for automatically decelerating an aircraft on a runway using an auto-brake control system having a brake-to exit function in accordance with an illustrative embodiment. Process 800 is a brake-to-exit control process, such as brake-to-exit function 214 of FIG. 2, for an automatic braking system controller, such as automatic braking system controller 202 of FIG. 2.

Process 800 begins by monitoring the aircraft velocity and position to calculate the target deceleration (step 802). The target deceleration can be, for example target deceleration 242, shown in block form in FIG. 2.

Process 800 then determines whether the aircraft can comfortably decelerate to a selected velocity prior to reaching a target location along the runway (step 804). The selected velocity can be, for example, selected velocity 218 corresponding to a taxi speed of aircraft 200. The selected velocity can be a default velocity of about 15 knots. In this illustrative example, process 800 determines target location 232 by subtracting exit buffer distance 234 from exit location 226.

Responsive to determining that the aircraft can decelerate to a selected velocity prior to reaching a target location along the runway ("yes" at step 804), process 800 automatically decelerates the aircraft such that the aircraft reaches the selected velocity at the target location (step 806). By decelerating to selected velocity 218 at target location 232, process 800 allows for a smoother deceleration profile as aircraft 200 approaches target location 232, thereby reducing passenger discomfort, thermal energy generation by the brake system, and runway occupancy time of the aircraft.

Returning now to step 804, responsive to determining that the aircraft cannot decelerate to the selected velocity prior to reaching the target location along the runway ("no" at step 804), process 800 provides an alert that the aircraft cannot decelerate to the selected velocity prior to reaching the target location (step 808). The alert can be, for example, alert 252 shown in block form in FIG. 2. Process 800 then automatically decelerates the aircraft such that the aircraft reaches the selected velocity at a location beyond target location (step 810).

Process 800 determines whether a pilot override is received (step 812). The pilot override can be for example, pilot override 254 shown in block form in FIG. 2. Responsive to receiving a pilot override ("yes" at step 812), process 800 disarms the brake-to-exit function (step 814), with the process terminating thereafter.

Returning now to step 812, if a pilot override is not received ("no" at step 812), process 800 determines whether the aircraft has past and end-of-runway buffer location (step 816). The end-of-runway buffer location can be, for example end-of-runway buffer location 258 shown in block form in FIG. 2. If the aircraft has not passed the end-of-runway buffer location ("no" at step 816), process 800 iterates back to step 812.

If the aircraft has passed the in the runway buffer location ("yes" at step 816), process 800 automatically decelerates the aircraft from the selected velocity at a preferred deceleration of the aircraft such that the aircraft stops prior to overrunning the runway (step 818). Process 800 then disarms the brake-to-exit function (step 814), with the process terminating thereafter.

Figure 9:
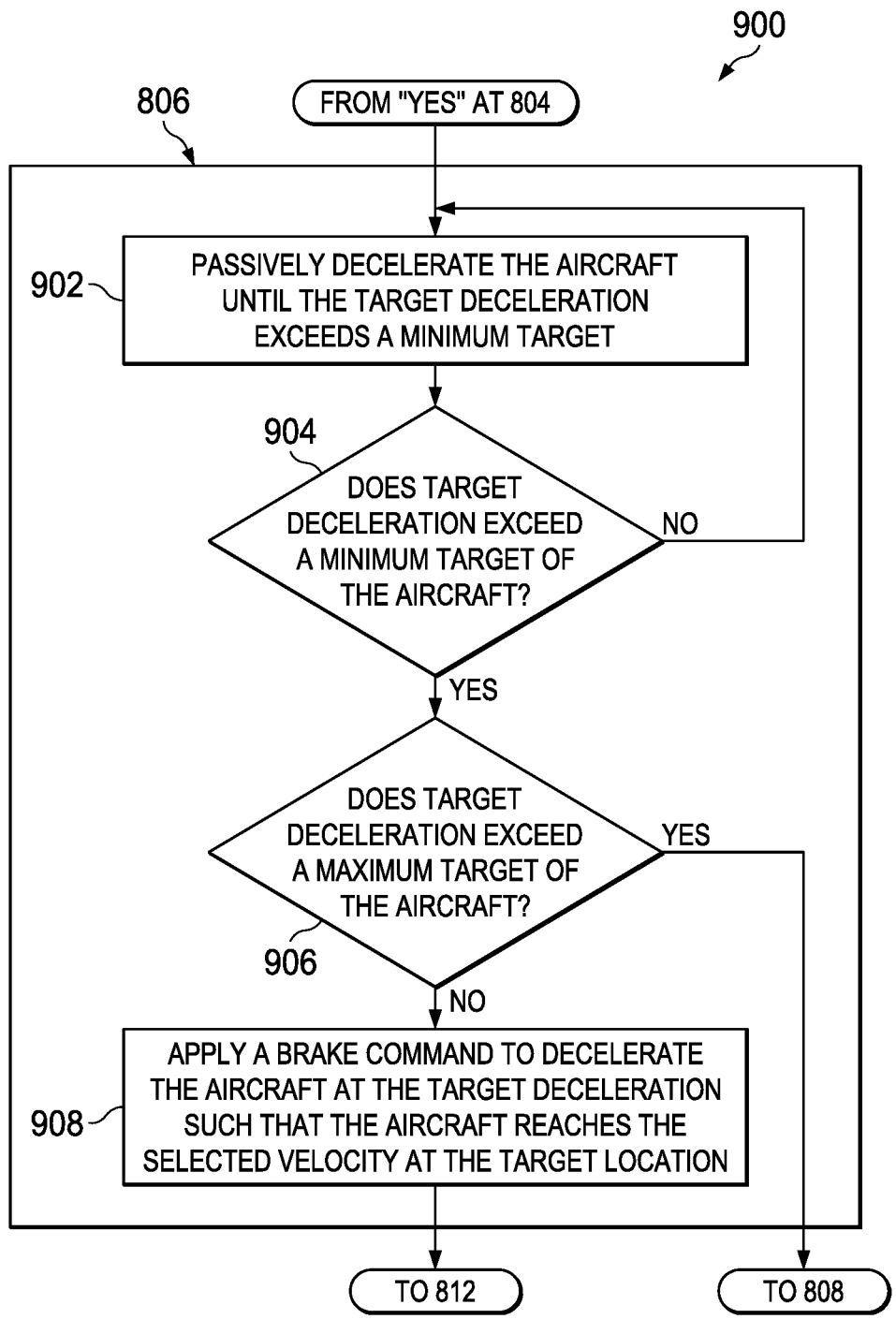
FIG. 9 is an illustration of a flowchart of a process for automatically decelerating an aircraft on a runway using an auto-brake control system having a brake-to-exit function having various control states in accordance with an illustrative embodiment.

Referring now to FIG. 9, an illustration of a flowchart of a process for automatically decelerating an aircraft on a runway using an auto-brake control system having a brake-to-exit function having various control states in accordance with an illustrative embodiment. Process 900 is a more detailed flowchart of steps 802-806 of process 800.

In response to determining that the aircraft can decelerate to a selected velocity prior to reaching the target location along the runway, process 900 passively decelerates the aircraft until the target deceleration exceeds a minimum target (step 902). By passively decelerating aircraft 200, process 900 allows aircraft 200 to take advantage of longer runway lengths where exit location 226 is farther away from a touchdown zone for runway 210. Additionally, because aircraft 200 decelerates at a slower rate than minimum target 250, process 900 reduces the runway occupancy time of aircraft 200.

Process 900 then determines whether a target deceleration exceeds a minimum target of the aircraft (step 904). By passively decelerating aircraft 200 until the target deceleration exceeds a minimum target, process 900 reduces passenger discomfort and thermal energy generation of brakes 122. If the target deceleration does not exceed the minimum target ("no" at step 904), process 900 iterates back to step 902.

If the target deceleration exceeds the minimum target ("yes" at step 904), process 900 determines whether the target deceleration exceeds a maximum target (step 906). The maximum target can be, for example, maximum target 248, shown in block form in FIG. 2.

If the target deceleration exceeds the maximum target ("yes" at step 906), process 900 applies a brake system to decelerate the aircraft at the target deceleration such that the aircraft reaches the selected velocity at the target location (step 908). Process 900 resumes process 800 at step 812 of FIG. 8. If the target deceleration does not exceed the maximum target ("no" at step 906), process 900 resumes process 800 at step 812 of FIG. 8.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 10:
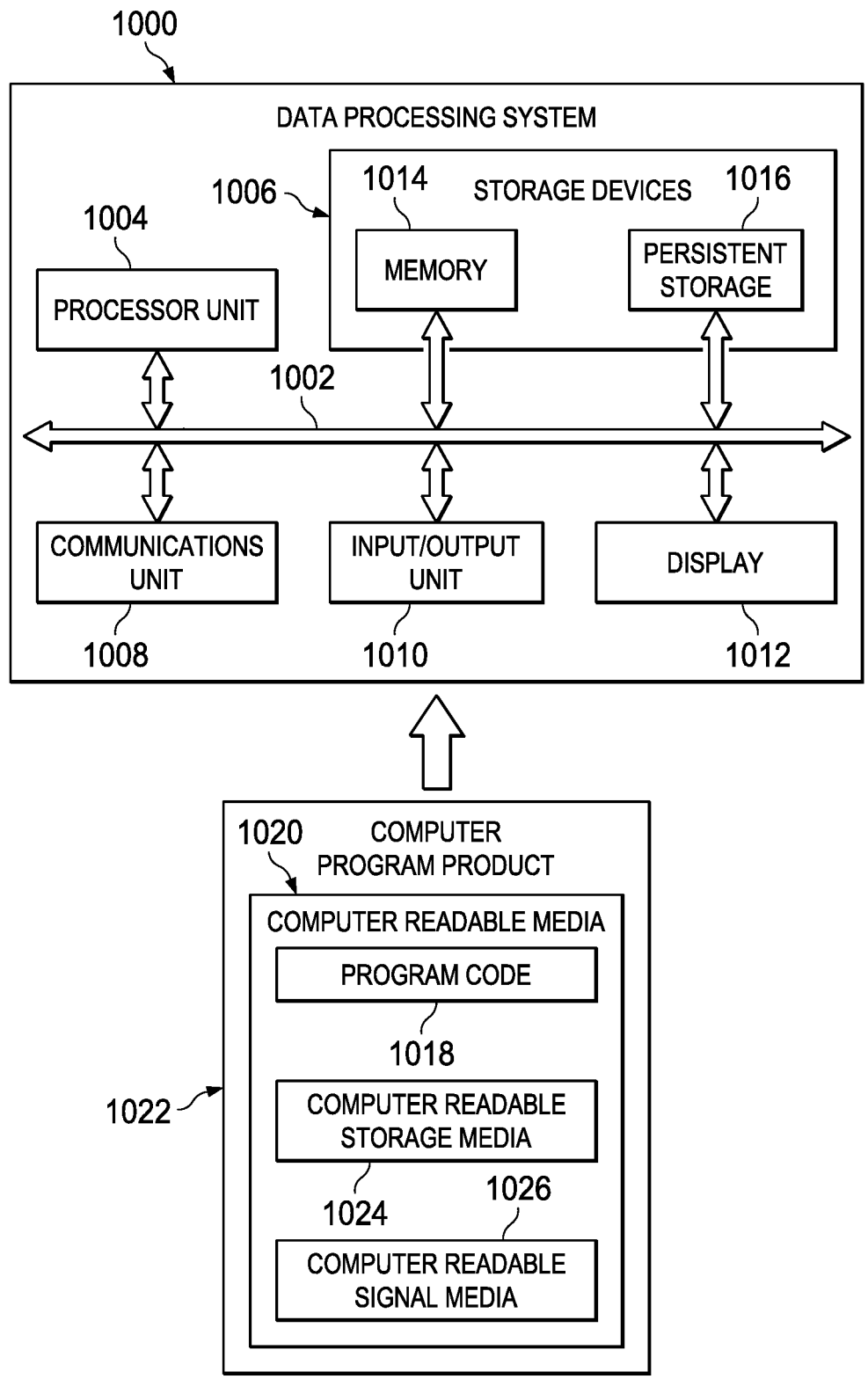
FIG. 10 is an illustration of a block diagram for a computer system in which a brake-to-exit function for an auto-brake control system can be implemented in accordance with an illustrative embodiment.

Turning now to FIG. 10, an illustration of a data processing system in the form of a block diagram is depicted in accordance with an illustrative embodiment. Data processing system 1000 may be used to implement at least one of flight management system 221 and automatic braking system controller 202 of FIG. 2. Data processing system 1000 may be used to process data, such as data from inertial data system 208 of FIG. 2, calculate distances such as current distance 238 on current distance 256, determine a target deceleration, such as target deceleration 216 of FIG. 2, and control and automatic braking system according to the target deceleration, such as braking system 120 of FIG. 2. As depicted, data processing system 1000 includes communications framework 1002, which provides communications between processor unit 1004, storage devices 1006, communications unit 1008, input/output unit 1010, and display 1012. In some cases, communications framework 1002 may be implemented as a bus system.

Processor unit 1004 is configured to execute instructions for software to perform a number of operations. Processor unit 1004 may comprise a number of processors, a multi-processor core, and/or some other type of processor, depending on the implementation. In some cases, processor unit 1004 may take the form of a hardware unit, such as a circuit system, an application specific integrated circuit (ASIC), a programmable logic device, or some other suitable type of hardware unit.

Instructions for the operating system, applications, and/or programs run by processor unit 1004 may be located in storage devices 1006. Storage devices 1006 may be in communication with processor unit 1004 through communications framework 1002. As used herein, a storage device, also referred to as a computer readable storage device, is any piece of hardware capable of storing information on a temporary and/or permanent basis. This information may include, but is not limited to, data, program code, and/or other information.

Memory 1014 and persistent storage 1016 are examples of storage devices 1006. Memory 1014 may take the form of, for example, a random access memory or some type of volatile or non-volatile storage device. Persistent storage 1016 may comprise any number of components or devices. For example, persistent storage 1016 may comprise a hard drive, a flash memory, a rewritable optical disk, a rewritable magnetic tape, or some combination of the above. The media used by persistent storage 1016 may or may not be removable.

Communications unit 1008 allows data processing system 1000 to communicate with other data processing systems and/or devices. Communications unit 1008 may provide communications using physical and/or wireless communications links.

Input/output unit 1010 allows input to be received from and output to be sent to other devices connected to data processing system 1000. For example, input/output unit 1010 may allow user input to be received through a keyboard, a mouse, and/or some other type of input device. As another example, input/output unit 1010 may allow output to be sent to a printer connected to data processing system 1000.

Display 1012 is configured to display information to a user. Display 1012 may comprise, for example, without limitation, a monitor, a touch screen, a laser display, a holographic display, a virtual display device, and/or some other type of display device.

In this illustrative example, the processes of the different illustrative embodiments may be performed by processor unit 1004 using computer-implemented instructions. These instructions may be referred to as program code, computer usable program code, or computer readable program code, and may be read and executed by one or more processors in processor unit 1004.

In these examples, program code 1018 is located in a functional form on computer readable media 1020, which is selectively removable, and may be loaded onto or transferred to data processing system 1000 for execution by processor unit 1004. Program code 1018 and computer readable media 1020 together form computer program product 1022. In this illustrative example, computer readable media 1020 may be computer readable storage media 1024 or computer readable signal media 1026.

Computer readable storage media 1024 is a physical or tangible storage device used to store program code 1018 rather than a medium that propagates or transmits program code 1018. Computer readable storage media 1024 may be, for example, without limitation, an optical or magnetic disk or a persistent storage device that is connected to data processing system 1000.

Alternatively, program code 1018 may be transferred to data processing system 1000 using computer readable signal media 1026. Computer readable signal media 1026 may be, for example, a propagated data signal containing program code 1018. This data signal may be an electromagnetic signal, an optical signal, and/or some other type of signal that can be transmitted over physical and/or wireless communications links.

The illustration of data processing system 1000 in FIG. 10 is not meant to provide architectural limitations to the manner in which the illustrative embodiments may be implemented. The different illustrative embodiments may be implemented in a data processing system that includes components in addition to or in place of those illustrated for data processing system 1000. Further, components shown in FIG. 10 may be varied from the illustrative examples shown.

Figure 11:
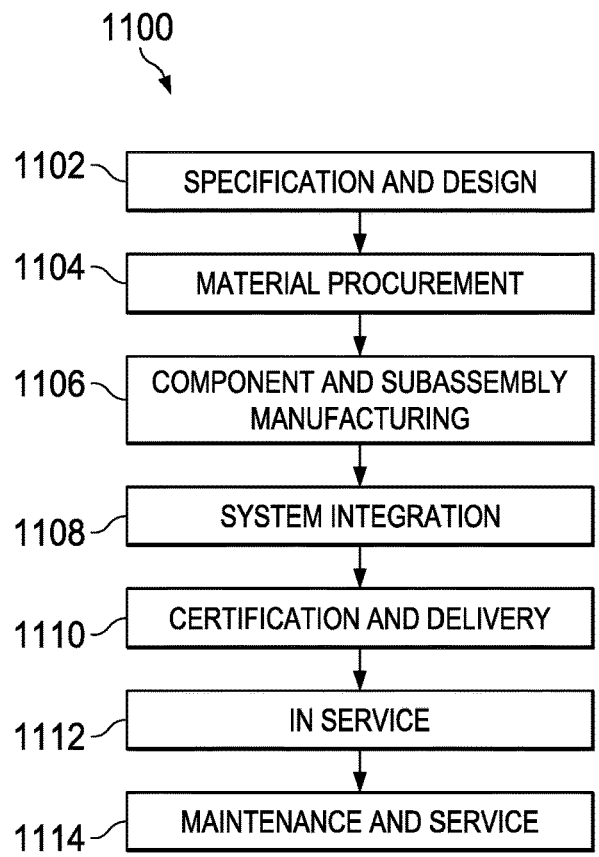
FIG. 11 is an illustration of a block diagram of an aircraft manufacturing and service method in accordance with an illustrative embodiment.
Figure 12:
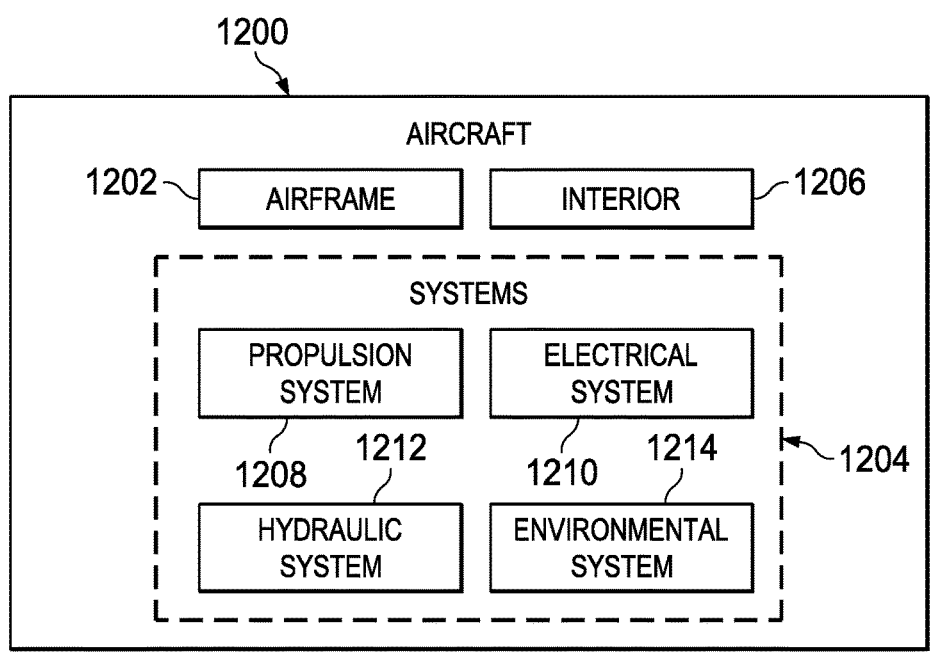
FIG. 12 is an illustration of a block diagram of an aircraft in which an illustrative embodiment may be implemented.

The illustrative embodiments of the disclosure may be described in the context of aircraft manufacturing and service method 1100 as shown in FIG. 11 and aircraft 1200 as shown in FIG. 12. Turning first to FIG. 11, an illustration of a block diagram of an aircraft manufacturing and service method is depicted in accordance with an illustrative embodiment. During pre-production, aircraft manufacturing and service method 1100 may include specification and design 1102 of aircraft 1200 of FIG. 12 and material procurement 1104.

During production, component and subassembly manufacturing 1106 and system integration 1108 of aircraft 1200 takes place. Thereafter, aircraft 1200 may go through certification and delivery 1110 in order to be placed in service 1112. While in service 1112 by a customer, aircraft 1200 is scheduled for routine maintenance and service 1116, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of a block diagram of an aircraft is depicted in which an illustrative embodiment may be implemented. In this example, aircraft 1200 is produced by aircraft manufacturing and service method 1100 of FIG. 11 and may include airframe 1202 with plurality of systems 1204 and interior 1206. Examples of systems 1204 include one or more of propulsion system 1208, electrical system 1210, hydraulic system 1212, and environmental system 1216. Any number of other systems may be included. Although an aerospace example is shown, different illustrative embodiments may be applied to other industries, such as the automotive industry. The apparatuses and methods embodied herein may be employed during at least one of the stages of aircraft manufacturing and service method 1100 of FIG. 11.

One or more illustrative embodiments may be used during component and subassembly manufacturing 1106. For example, automatic braking system controller 202 including brake-to-exit function 214 may be installed during component and subassembly manufacturing 1106 of FIG. 11.

The description of the different illustrative embodiments has been presented for purposes of illustration and description, and may be not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for automatically decelerating an aircraft to a selected velocity at a target location on a runway, the method comprising an automatic braking system controller:
calculating a maximum target deceleration rate and a minimum target deceleration rate for the aircraft on the runway, each determined based on both thermal energy generation and runway dwell time for the aircraft;
using a current location of the aircraft and a current velocity of the aircraft for iteratively determining:
a first stopping point of the aircraft using the maximum target deceleration rate;
a second stopping point of the aircraft using the minimum target deceleration rate;
a target deceleration required to decelerate the aircraft to the selected velocity at the target location; and
a sufficiency or an insufficiency of the maximum target deceleration rate to stop the aircraft before an end of the runway;
applying, when required to stop the aircraft before the end of the runway, braking pressure for the aircraft to achieve the maximum target deceleration rate;
responsive to the maximum target deceleration rate being insufficient to stop the aircraft before the end of the runway, deriving a deceleration value that will stop the aircraft before the end of the runway, and applying braking pressure for decelerating the aircraft at the deceleration value that will stop the aircraft before the end of the runway;
responsive to the maximum target deceleration rate being sufficient to stop the aircraft before the end of the runway, preventing applying braking pressure to brakes of the aircraft on the runway until a current deceleration of the aircraft exceeds the minimum target deceleration rate; and
responsive to the target deceleration being between the minimum target deceleration rate and the maximum target deceleration rate, applying braking pressure to the brakes of the aircraft on the runway for maintaining the target deceleration until reaching the selected velocity and then maintaining the selected velocity until one of: receiving an override command disarming the automatic braking controller, or the current location of the aircraft requiring the maximum target deceleration rate for stopping the aircraft before the end of the runway.

2. The method of claim 1, further comprising:
determining an exit location at which the aircraft should exit the runway; and
subtracting an exit buffer distance from the exit location to determine the target location.

3. The method of claim 1, further comprising:
continuously adjusting the target deceleration to ensure the aircraft reaches the selected velocity at the target location based on the selected velocity and a current distance between the current location of the aircraft and the target location.

4. The method of claim 1, further comprising:
in response to determining that the aircraft cannot decelerate to the selected velocity prior to reaching the target location, providing an alert that the aircraft cannot decelerate to the selected velocity prior to reaching the target location; and
automatically decelerating the aircraft at a preferred deceleration of the aircraft such that the aircraft reaches the selected velocity at a location beyond the target location.

5. The method of claim 1, further comprising:
in response to decelerating the aircraft to the selected velocity, maintaining the selected velocity until a pilot override is received.

6. The method of claim 1, further comprising:
determining a current distance of the aircraft to an end-of-runway location; and
in response to determining that the aircraft has passed an end-of-runway buffer location, automatically decelerating the aircraft from the selected velocity at a preferred deceleration of the aircraft or beyond as necessary such that the aircraft stops prior to overrunning the runway.

7. An auto-brake control system configured to:
control a brake system to automatically decelerate an aircraft such that the aircraft reaches a selected velocity at a target location on a runway;
calculate a maximum target deceleration rate and a minimum target deceleration rate for the aircraft on the runway, each determined based on both thermal energy generation and runway dwell time for the aircraft;
use a current location of the aircraft and a current velocity of the aircraft to iteratively determine:
a first stopping point of the aircraft using the maximum target deceleration rate;
a second stopping point of the aircraft using the minimum target deceleration rate;
a target deceleration required to decelerate the aircraft to the selected velocity at the target location; and
a sufficiency or insufficiency of the maximum target deceleration rate to stop the aircraft before an end of the runway;
apply, when required to stop the aircraft before the end of the runway, braking pressure for the aircraft to achieve the maximum target deceleration rate;
responsive to the maximum target deceleration rate being insufficient to stop the aircraft before the end of the runway, derive a deceleration value that will stop the aircraft before the end of the runway, and apply braking pressure that decelerates the aircraft at the deceleration value that will stop the aircraft before the end of the runway;
responsive to the maximum target deceleration rate being sufficient to stop the aircraft before the end of the runway, prevent an application of braking pressure to brakes of the aircraft on the runway until a current deceleration of the aircraft exceeds the minimum target deceleration rate; and
responsive to the target deceleration being between the minimum target deceleration rate and the maximum target deceleration rate, apply a braking pressure to the brakes of the aircraft on the runway that maintains the target deceleration until the aircraft reaches the selected velocity and then maintains the selected velocity until one of: receiving an override command that disarms the auto-brake control system, or the current location of the aircraft requires the maximum target deceleration rate to stop the aircraft before the end of the runway.

8. The auto-brake control system of claim 7, wherein the auto-brake control system is further configured:
to determine an exit location at which the aircraft should exit the runway; and
to subtract an exit buffer distance from the exit location to determine the target location.

9. The auto-brake control system of claim 7, wherein the auto-brake control system is further configured to continuously adjust the target deceleration to ensure the aircraft reaches the selected velocity at the target location based on the selected velocity and a current distance between the current location of the aircraft and the target location.

10. The auto-brake control system of claim 7, wherein the auto-brake control system is further configured:
in response to determining that the aircraft cannot decelerate to the selected velocity prior to reaching the target location, alerting a pilot that the aircraft cannot decelerate to the selected velocity prior to reaching the target location; and
to automatically decelerate the aircraft at a preferred deceleration of the aircraft such that the aircraft reaches the selected velocity at a location beyond the target location.

11. The auto-brake control system of claim 7, wherein the auto-brake control system is further configured:
in response to decelerating the aircraft to the selected velocity, to maintain the selected velocity until a pilot override is received.

12. The auto-brake control system of claim 7, wherein the auto-brake control system is further configured:
to determine a current distance of the aircraft to an end-of-runway location; and
in response to determining that the aircraft has passed an end-of-runway buffer location, to automatically decelerate the aircraft from the selected velocity at a preferred deceleration of the aircraft such that the aircraft stops prior to overrunning the runway.

13. An aircraft configured to travel at a selected velocity at a target location, such that the aircraft comprises :
an auto-brake control system configured to:
control a brake system to automatically decelerate the aircraft on a runway;
calculate a maximum target deceleration rate and a minimum target deceleration rate for the aircraft on the runway, each determined based on both thermal energy generation and runway dwell time for the aircraft;
use a current location of the aircraft and a current velocity of the aircraft to iteratively determine:
a first stopping point of the aircraft using the maximum target deceleration rate;
a second stopping point of the aircraft using the minimum target deceleration rate;
a target deceleration required to decelerate the aircraft to the selected velocity at the target location; and
a sufficiency or insufficiency of the maximum target deceleration rate to stop the aircraft before an end of the runway;
apply, when required to stop the aircraft before the end of the runway, braking pressure for the aircraft to achieve the maximum target deceleration rate;
responsive to the maximum target deceleration rate being insufficient to stop the aircraft before the end of the runway, derive a deceleration value that will stop the aircraft before the end of the runway, and apply braking pressure that decelerates the aircraft at the deceleration value that will stop the aircraft before the end of the runway;
responsive to the maximum target deceleration rate being sufficient to stop the aircraft before the end of the runway, prevent an application of braking pressure to brakes of the aircraft on the runway until a current deceleration of the aircraft exceeds the minimum target deceleration rate;
responsive to the target deceleration being between the minimum target deceleration rate and the maximum target deceleration rate, apply a braking pressure to the brakes of the aircraft on the runway that maintains the target deceleration until the aircraft reaches the selected velocity and then maintains the selected velocity until one of: receiving an override command that disarms the auto-brake control system, or the current location of the aircraft requires the maximum target deceleration rate to stop the aircraft before the end of the runway; and
a graphical user interface comprising a status indicator of a brake-to-exit function associated with the auto-brake control system.

14. The aircraft of claim 13, wherein the auto-brake control system is further configured:
to determine an exit location at which the aircraft should exit the runway; and
to subtract an exit buffer distance from the exit location to determine the target location.

15. The aircraft of claim 13, wherein in automatically decelerating the aircraft, the auto-brake control system is further configured:
to continuously adjust the target deceleration to ensure the aircraft reaches the selected velocity at the target location based on the selected velocity and a current distance between the aircraft and the target location.

16. The aircraft of claim 13, wherein the graphical user interface is further configured:
in response to determining that the aircraft cannot decelerate to the selected velocity prior to reaching the target location, alerting a pilot that the aircraft cannot decelerate to the selected velocity prior to reaching the target location; and
wherein the auto-brake control system is further configured:
to automatically decelerate the aircraft at a preferred deceleration of the aircraft such that the aircraft reaches the selected velocity at a location beyond the target location.

17. The aircraft of claim 13, wherein the auto-brake control system is further configured:
in response to decelerating the aircraft to the selected velocity, to maintain the selected velocity until a pilot override is received.

18. The aircraft of claim 13, wherein the auto-brake control system is further configured:
to determine a current distance of the aircraft to an end-of-runway location; and
in response to determining that the aircraft has passed an end-of-runway buffer location, to automatically decelerate the aircraft from the selected velocity at a preferred deceleration of the aircraft or beyond as necessary such that the aircraft stops prior to overrunning the runway.

19. The aircraft of claim 13, wherein the brake-to-exit function is in-part initialized based on a determination of the selected velocity and an exit location.

\* \* \* \* \*